United States Patent
Kerschbaum et al.

(10) Patent No.: US 12,003,621 B2
(45) Date of Patent: Jun. 4, 2024

(54) METHOD FOR MANAGING KEYS OF A SECURITY GROUP

(71) Applicant: Siemens Aktiengesellschaft, Munich (DE)

(72) Inventors: Sven Kerschbaum, Fürth (DE); Stephan Höme, Schwabach (DE); Thomas Fischer, Erlangen (DE); Jung Konstantin, Weisendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/020,328

(22) PCT Filed: Jul. 6, 2021

(86) PCT No.: PCT/EP2021/068610
§ 371 (c)(1),
(2) Date: Feb. 8, 2023

(87) PCT Pub. No.: WO2022/033771
PCT Pub. Date: Feb. 17, 2022

(65) Prior Publication Data
US 2023/0231700 A1    Jul. 20, 2023

(30) Foreign Application Priority Data
Aug. 10, 2020  (EP) .................... 20190195

(51) Int. Cl.
*H04L 9/08*  (2006.01)
*H04L 9/32*  (2006.01)

(52) U.S. Cl.
CPC .......... *H04L 9/0825* (2013.01); *H04L 9/3228* (2013.01)

(58) Field of Classification Search
CPC ....... H04L 9/0825; H04L 9/3228; H04L 9/08; H04L 9/0816; H04L 9/0819; H04L 9/0833; H04W 12/041; H04W 12/0431
See application file for complete search history.

(56) References Cited

U.S. PATENT DOCUMENTS

| 10,230,696 B2 * | 3/2019 | Smith ................. H04L 63/0807 |
| 2007/0248232 A1 * | 10/2007 | Driscoll ............ H04W 12/0431 |
| | | 713/153 |

(Continued)

FOREIGN PATENT DOCUMENTS

| CN | 101981864 | 2/2011 |
| CN | 107580766 | 1/2018 |

(Continued)

OTHER PUBLICATIONS

PCT International Search Report and Written Opinion dated Sep. 22, 2021 based on PCT/EP2021/068610 filed Jul. 6, 2021.

*Primary Examiner* — Oleg Korsak
(74) *Attorney, Agent, or Firm* — Cozen O'Connor

(57) ABSTRACT

A method of adding a first publisher to a security group includes receiving a key request for keys for the first publisher, wherein the key request has at least one credential associated with the first publisher and a key parameter index indicative of a bandwidth of the first publisher, includes modifying a lifetime value of the at least one key of the security group based on the key parameter index of the received key request, wherein an expiry of the at least one key is based on the lifetime value of the one or more keys; and includes transmitting the at least one key and the modified lifetime value of the at least one key to the first publisher, where the first publisher is configured to publish at least one message encrypted using the at least one key, prior to expiry of the at least one key.

9 Claims, 3 Drawing Sheets

(56) References Cited

U.S. PATENT DOCUMENTS

| | | | |
|---|---|---|---|
| 2008/0292105 A1* | 11/2008 | Wan | H04L 9/0825 |
| | | | 380/282 |
| 2009/0252324 A1 | 10/2009 | Seleznev et al. | |
| 2013/0311791 A1* | 11/2013 | Falk | G05B 19/0425 |
| | | | 713/194 |
| 2014/0129838 A1* | 5/2014 | Kim | H04L 63/0807 |
| | | | 713/171 |
| 2015/0280910 A1* | 10/2015 | Crawford | H04L 63/061 |
| | | | 713/171 |
| 2016/0057237 A1* | 2/2016 | Yang | H04W 12/02 |
| | | | 709/224 |
| 2016/0080334 A1* | 3/2016 | Hamilton | H04L 63/10 |
| | | | 713/168 |
| 2016/0330209 A1* | 11/2016 | Iacob | H04L 9/0825 |
| 2016/0365975 A1 | 12/2016 | Smith | |
| 2016/0366111 A1* | 12/2016 | Smith | H04L 63/102 |
| 2017/0126404 A1* | 5/2017 | Unagami | G06F 21/44 |
| 2018/0316500 A1* | 11/2018 | Xu | H04L 63/068 |
| 2020/0336523 A1* | 10/2020 | Bang | H04L 9/0643 |
| 2020/0366658 A1* | 11/2020 | Bang | H04L 9/14 |
| 2021/0266160 A1* | 8/2021 | Edwards | H04L 12/2859 |

FOREIGN PATENT DOCUMENTS

| | | |
|---|---|---|
| CN | 107637038 | 1/2018 |
| CN | 110418342 | 11/2019 |

\* cited by examiner

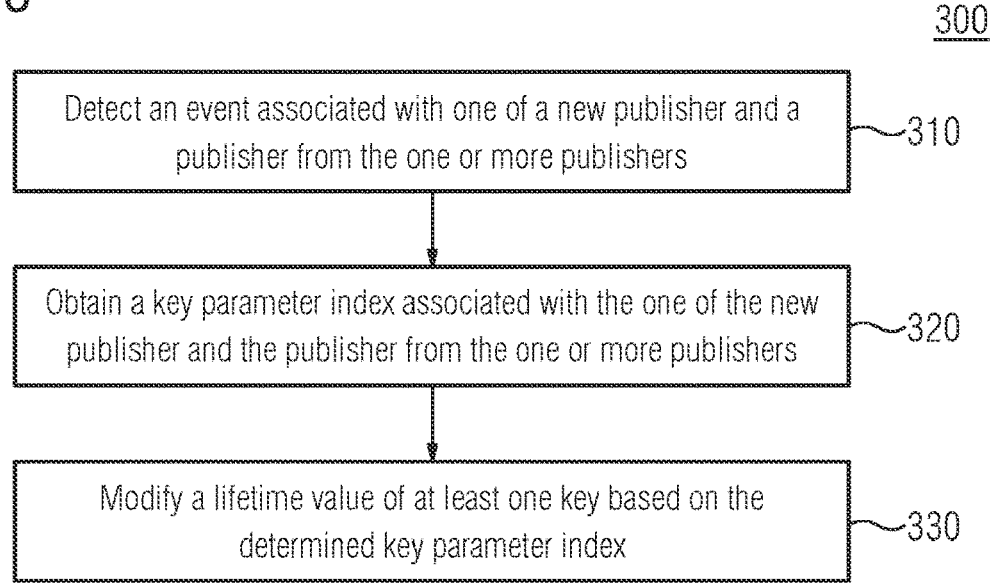
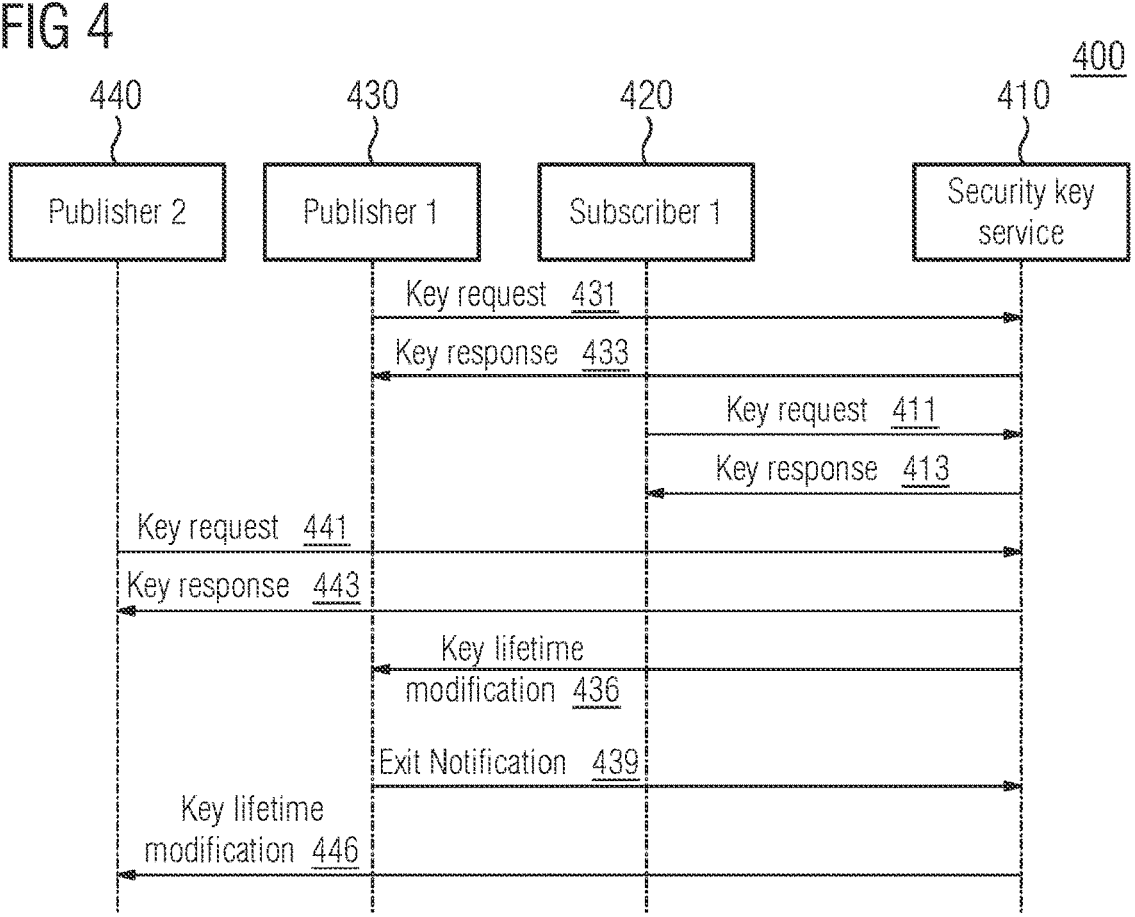

METHOD FOR MANAGING KEYS OF A SECURITY GROUP

CROSS-REFERENCE TO RELATED APPLICATIONS

This is a U.S. national stage of application No. PCT/EP2021/068610 filed 6 Jul. 2021. Priority is claimed on European Application No. 20190195.6 filed 10 Aug. 2020, the content of which is incorporated herein by reference in its entirety.

BACKGROUND OF THE INVENTION

1. Field of the Invention

The current disclosure relates to security and, more particularly, to key management in publish-subscribe techniques in industrial systems.

2. Description of the Related Art

Open Platform Communications Unified Architecture (OPC UA) is a well-established standard for communication in the automation domain. Today, mainly the client/server-method is used. In February 2018, the client/server-approach has been extended to a publish/subscribe-approach. This allows for data transfer from one publisher to several subscribers. Accordingly, data pushed to the network by a publisher may principally be received by every participant.

One key aspect in OPC UA relates to security. In particular, for OPC UA publish-subscribe pattern, security is not only required for data integrity and encryption, but also for access control. The publishers and subscribers are loosely coupled (i.e., publishers do not know the subscribers). Accordingly, publishers and subscribers require a security service that manages encryption and decryption keys (used for authentication and authorization). This service is the Security Key Service (specified in OPC 10000-14 5.3.7 and 5.4.3).

The Security Key Service (SKS) generates the required keys with a defined lifetime that may be defined by the publisher when creating a Security Group. A security group is a set of subscribers and publishers using a set of related encryption and decryption keys. Subsequent to the generation of the keys and upon receiving key request from publishers or subscribers, the Security Key Service transmits the keys to the publishers and to the subscribers, so that the publisher may encrypt messages using the keys and the subscriber may decrypt the messages using the keys. The lifetime of the keys may be influenced by various factors. For security reasons, using one key, only a defined amount of data may be transmitted, hence, the cycle time and amount of data published by a publisher influence the lifetime of the key.

Conventionally, the lifetime of the key material is defined by the publisher when creating the security group. To this end, the publisher determines on the amount of data it plans on publishing per a predefined time period. Hence, a security group may practically be used only by one single publisher. However, it can make sense to assign several publishers to a security group, because this reduces the efforts required for key management. However, this is not addressed in the current approaches.

SUMMARY OF THE INVENTION

In view of the foregoing, it is an object of the invention to provide a method and device which is capable of creating a security group with a plurality of publishers. It is more particularly and object of the invention to provide a method that can dynamically modify the lifetime of the keys of a security group when the constituents of the security group are changed during run time.

These and other objects and advantages are achieved in accordance with the invention by methods, an industrial device and a non-transitory storage medium, where, in an embodiment, a method of adding a first publisher to a security group is provided. The security group comprises one or more publishers and one or more subscribers. The one or more publishers are configured to publish messages encrypted using at least one key associated with the security group. The method comprises receiving a key request for keys for the first publisher, where the key request comprises one or more credentials associated with the first publisher and a key parameter index indicative of a bandwidth of the first publisher. The method also comprises modifying a lifetime value of the at least one key of the security group based on the key parameter index of the received key request, where an expiry of the at least one key is based on the lifetime value of the one or more keys. The method additionally includes transmitting the at least one key and the modified lifetime value of the at least one key to the first publisher. The first publisher is configured to publish one or more messages encrypted using the at least one key, prior to the expiry of the at least one key.

Accordingly, a dynamic manner of adding publishers to existing security group is provided. At the same time, the security of the security group is maintained by adjusting the lifetime of the key based on the bandwidth associated with the newly added publisher. Hence, the need for additional security groups by accommodating new publishers in existing security groups is reduced.

In an example, the key request is generated by a configuration tool on behalf of the first publisher. Accordingly, during a configuration of an industrial device as a publisher, the configuration tool can configure the industrial device and add the device to a security group. In another example, the key request is generated by the first publisher. Accordingly, a new industrial device added to the industrial facility can add itself to a security group by generating the key request. In an embodiment, the method is performed by a security key service component. Similarly, the key parameter index is a lifetime estimate generated by the first publisher. Accordingly, the above method is compatible with OPC UA.

In another embodiment, a method of managing at least one key of a security group is provided. The security group comprises one or more publishers and one or more subscribers. The one or more publishers are configured to publish data encrypted using the at least one key. The method comprises detecting an event associated with one of a new publisher and a publisher from the one or more publishers. The method also comprises determining a key parameter index associated with the one of the new publisher and the publisher, where the key parameter index is indicative of a bandwidth of the one of the new publisher and the publisher. The method additionally comprises modifying a lifetime value of the at least one key based on the determined key parameter index, where the at least one key expires at a time instance based on the lifetime value of the at least one key.

Accordingly, in addition to dynamically adding publishers, the disclosed embodiments also allow for adjustment of the lifetime of keys of a security group when a publisher leaves the security group or when a publisher becomes inactive or when a publisher changes its bandwidth. Accordingly, the lifetime of key may be extended when publishers exit or become inactive.

In an example, the method further comprises distributing a new key and a lifetime value associated with the new key to the publishers and the subscribers of the security group, at the expiry of the at least one key, where the lifetime value of the new key is based on bandwidth associated with the publishers. In an example, the one or more publishers includes a programmable logic controller (PLC).

The objects of the invention are also achieved by an industrial device for managing at least one key of a security group. The security group comprises one or more publishers and one or more subscribers. The one or more publishers are configured to publish data encrypted using the at least one key. The industrial device comprises one or more processors configured to detect an event associated with one of a new publisher and an publisher from the one or more publishers, configured to determine a key parameter index associated with the detected one of the new publisher and the publisher, where the key parameter index is indicative of a bandwidth of the one of the new publisher and the publisher, and configured to modify a lifetime value of the at least one key based on the determined key parameter index, where the at least one key expires at a time instance based on the lifetime value of the at least one key.

It is a further object of the invention to provide a non-transitory storage medium for managing at least one key of a security group. The security group comprises one or more publishers and one or more subscribers. The one or more publishers are configured to publish data encrypted using the at least one key. The non-transitory storage medium comprises a plurality of instructions which when executed by one or more processors, cause the one or more processors to detect an event associated with one of a new publisher and a publisher from the one or more publishers; determine a key parameter index associated with the one of the new publisher and the publisher, where the key parameter index is indicative of a bandwidth of the one of the new publisher and the publisher; and modify a lifetime value of the at least one key based on the determined key parameter index, where the at least one key expires at a time instance based on the lifetime value of the at least one key. The advantages of the methods apply to the devices described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following detailed description references the drawings, in which:

FIG. 3 is a flowchart of an exemplary method for managing at least one key of a security group in accordance with an embodiment of the invention;

FIG. 4 is an interaction diagram illustrating interactions between a security key service, a plurality of publishers and a subscriber in accordance with the invention.

DETAILED DESCRIPTION OF THE EXEMPLARY EMBODIMENTS

Figure 1:
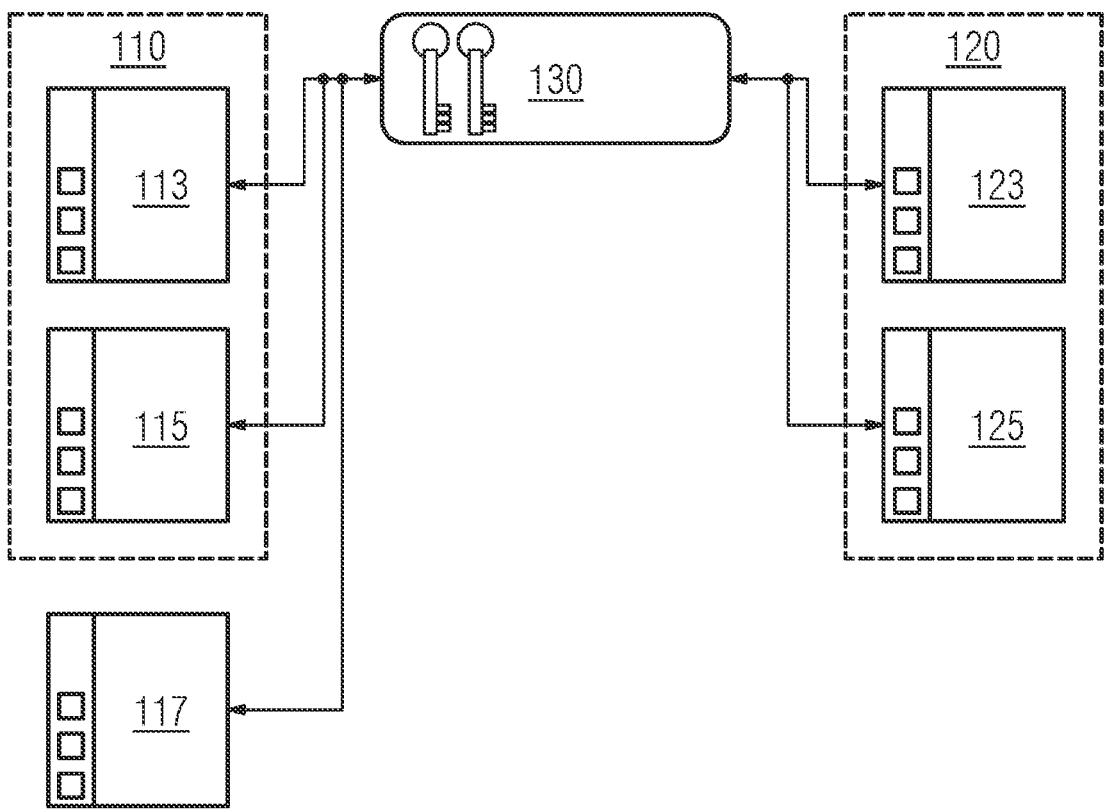
FIG. 1 is a schematic illustration of a security group comprising a plurality of publishers and subscribers in accordance with the invention.

FIG. 1 describes a security group 100 in an industrial automation system in an industrial facility. Industrial facility herein refers to any environment where one or more industrial processes, such as manufacturing, refining, smelting, assembly of equipment may occur and includes at least process plants, oil refineries, automobile factories, and/or warehouses. The security group 100 comprises one or more publishers (shown in the figure as publishers 113 and 115) and one or more subscribers (shown in the figure as subscribers 123 and 125). The industrial automation system comprises a plurality of industrial devices and subsystems, such as control devices, field devices, operator stations, and/or process historians. Control devices includes process controllers, programmable logic controllers, supervisory controllers, automated guidance vehicles, robots, and/or operator devices. Control devices are connected to a plurality of field devices (not shown in figure), such as actuators and sensor devices for monitoring and controlling industrial processes in the industrial facility. These field devices can include flowmeters, value actuators, temperature sensors, and/or pressure sensors. The control devices may be connected to each other via a control network (realized via wired and wireless networks). Operator stations display the status of the industrial plant to an operator and for allowing the operator to define setpoints for the control of the industrial processes in the facility. Publisher or subscriber herein refers to an industrial device or a subsystem of the industrial automation system. For example, publishers can include sensors configured to publish sensor data to subscribers including controllers, process historians, and/or operator stations. Publisher is configured to publish industrial data either at periodic intervals or at irregular intervals. Similarly, the subscribers are configured to receive data from one or more publisher to which it is subscribed.

To ensure security, the publishers use digital keys to sign or sign and encrypt published data. The subscribers are configured to determine the authenticity of the published data based on the signature of the publisher. Similarly, the subscribers may use decryption keys for decrypting the published data from the publishers. Accordingly, the security group 100 further includes a security key service 130. The security key service 130 is responsible for managing one or more keys of the security group. The one or more keys of the security group are used by the publishers and the subscribers as mentioned above. The management of the keys is explained using FIGS. 2 and 3.

Figure 2:
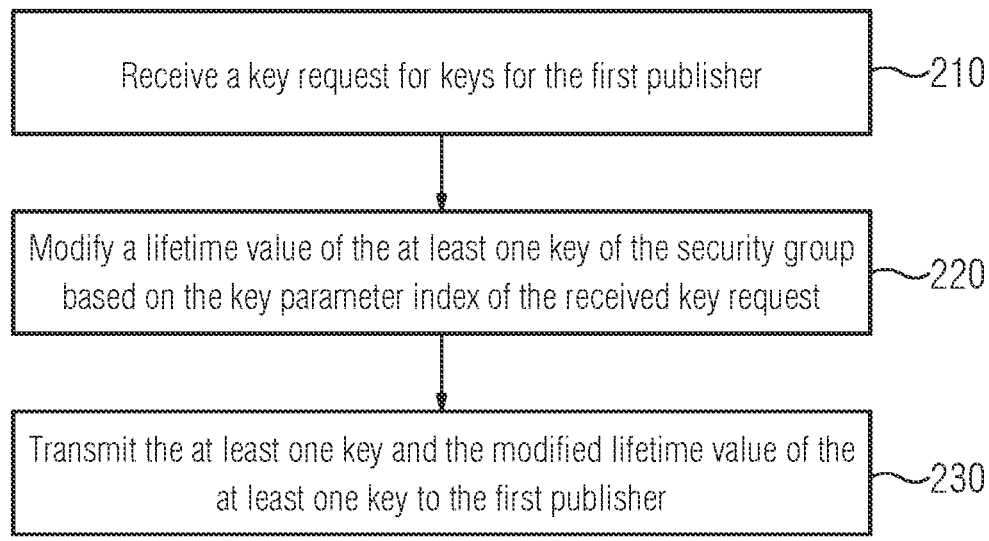
FIG. 2 is a flowchart of an exemplary method for adding a publisher of a security group in accordance with the invention.
Figure 5:
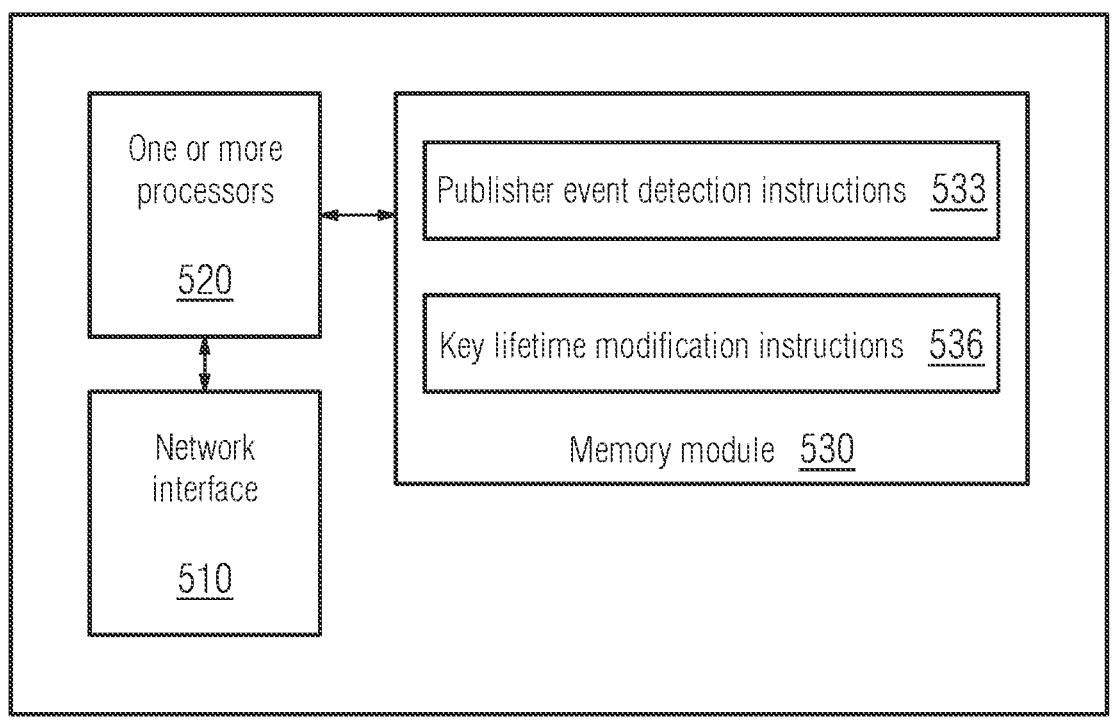
FIG. 5 illustrates an example industrial device for managing at least one key of a security group in accordance with the invention.

FIG. 2 illustrates a method 200 of adding a first publisher 117 to a security group 100. As mentioned previously the security group comprises publishers 113 and 115, and subscribers 123 and 125. The publishers 113 and 115 are existing publishers and are already publishing using at least one key of the security group 100. Accordingly, the existing publishers are shown as a group in the figure using rectangle 110. The subscribers 123 and 125 are existing subscribers and are already using the at least one key of the security group 100 to either verify or decrypt the published data from the publishers. Accordingly, the existing subscribers are shown as a group in the figure using rectangle 120. The first publisher 117 is not a member of the security group and accordingly does not have the at least one key of the security group 100. Accordingly, in an example, the first publisher 117 sends a key request to the security key service 130 for at least one key of the security group 100 and for joining the security group 100.

Accordingly, at step 210, the security key service 130 receives the key request for keys for the first publisher 117. The key request comprises one or more credentials associated with the first publisher 117 and a key parameter index indicative of a bandwidth of the first publisher 117. The credentials of the first publisher 117 may be generated by a configuration tool or a control system associated with the industrial facility. The one or more credentials associated with the first publisher 117 are used by the security key service 130 to determine if the first publisher 117 is authorized to be included to the security group 100 and to receive the at least one key of the security group 100. In an example, the one or more credentials are generated during by the configuration tool during engineering or configuration of the industrial devices in the industrial facility.

The key parameter index of the request is indicative of the bandwidth associated with the first publisher 117. Bandwidth herein refers to the amount of data the publisher intends to publish over a unit of time. A publisher that publishes a large volume of data, frequently has a high bandwidth as opposed to a publisher which publishes a small volume of data, over a long period of time. Accordingly, in order to ensure adequate security and since publishers with high bandwidth are more vulnerable, the lifetime of keys used by publishers with high bandwidth are kept short to ensure new keys are used more frequently. Similarly, since publishers with low bandwidth are less vulnerable, lifetime of keys used by publishers with low bandwidth are kept long (relative to the key lifetime of the publishers with high bandwidth). The lifetime of a key of the security group depends on the cumulative bandwidth of the publishers of the security group. Accordingly based on the key parameter index of the key request, the security key service can determine if the first publisher 117 has high bandwidth or low bandwidth.

At step 220, the security key service 130 then modifies a lifetime value of the at least one key of the security group based on the key parameter index of the received key request. Expiry of the at least one key is based on the lifetime value of the at least one key. As mentioned above, the security key service can estimate if the first publisher 117 has high bandwidth or low bandwidth based on the value of the key parameter index. Accordingly, since the first publisher 117 is a new publisher being added to the security group and will be using the at least one key to publish messages, the lifetime of the at least one key is modified to ensure security of the security group. Accordingly, based on the value of the key index parameter, the life time of the at least one key is reduced. Additionally, the at least one key expires at a time based on the lifetime value of the key. Accordingly, upon the expiry of the at least one key, the publishers stop using the at least one key.

At step 230, the security key service 130 then transmits the at least one key and the modified lifetime value of the at least one key (together referred to a key response) to the first publisher 117. Subsequent to receiving the key, the first publisher 117 is configured to publish one or more messages encrypted using the at least one key, prior to or till the expiry of the at least one key based on the lifetime of the at least one key.

Accordingly, the above method 200 describes a dynamic manner of adding new publishers to a security group without comprising the security of the security group by modifying the lifetime of the keys of the security group. While the above method is explained in relation to addition of a new publisher, the current disclosure can be applied to other such events associated with publishers. This is further explained in reference to FIG. 3.

FIG. 3 illustrates a method 300 of managing at least one key of the security group 100. As mentioned previously, the security group 100 comprises one or more publishers and one or more subscribers. The one or more publishers are configured to publish data using the at least one key. The method 300 is realized by the security key service 130.

At step 310, the security key service 130 detects an event associated with at one of a new publisher and a publisher from the one or more publishers (also referred to as existing publisher). For example, an event associated with a new publisher includes receiving a key request for a new publisher. For existing publishers, an event associated with a publisher includes receiving a notification message from an existing publisher indicating a change in the bandwidth associated with the publisher, or receiving a notification message from an existing publisher indicating that the publisher is leaving the security group, or a time-out event where a publisher is no longer responsive.

At 320, the security key service 130 then obtains a key parameter index associated with the detected at least one of the new publisher and the active publisher. The key parameter index is indicative of a bandwidth of the one of the new publisher and the publisher. Continuing the above examples, where the event is associated with addition of the new publisher, the key parameter index is obtained from the key request for the new publisher. Similarly, where the event is associated with change of bandwidth of an existing publisher, the key parameter index is obtained from the notification message from the existing publisher. Similarly, where the event is a time out event during which a publisher is no longer active, the key parameter index associated with the inactive publisher is obtained from the key request received while adding the now inactive publisher to the security group 110.

Then, at 330, the security key service 130 modifies a lifetime value of the at least one key based on the determined key parameter index. The at least one key expires at a time based on the lifetime value of the at least one key. This is further explained using below examples in relation to FIG. 4.

FIG. 4 is an interaction diagram 400 illustrating interactions between a security key service 410, publishers (430, 440) and a subscriber 420. At a first time instance (also referred to as T1), the security key service 410 receives a key request 431 from the publisher 430. Since no security groups have been created at this time, the security key service 410 creates a security group with a key. The key request 431 comprises one or more credentials associated with the publisher 430 and a key parameter index indicative of a bandwidth of the publisher 440. The lifetime of the key is determined based on the key parameter index in the key request 431 from the publisher 430. In an example, the key parameter index is a lifetime value determined by the publisher for its bandwidth. For example, the value of the key parameter index is 1 hour. Since publisher 430 is the only publisher in the group, the lifetime of the key of the security group is set to the lifetime value from the publisher 430, i.e., 1 hour. The security key service 410 then responds to the publisher 430 by sending a key response 433 containing the key of the security group, the identifier associated with the security group and the lifetime associated with the key of the security group.

At a second time instance (subsequent to the first time instance), the security key service 410 receives a key request 411 from the subscriber 420. The key request from the subscriber 420 contains the identifier associated with security group and the credentials of the subscriber 420. After authenticating the subscriber 420 using the credentials of the subscriber 420, the security key service 410 sends a key response 413 containing the key of the security group and lifetime value of the key to the subscriber 420.

At a third time instance (also referred to as T3, subsequent to the first-time instance), the security key service 410 receives a key request 441 from the publisher 440. The key request 441 comprises one or more credentials associated with the publisher 440 and a key parameter index indicative of a bandwidth of the publisher 440. Then, based on the key parameter index associated with the publisher 440, the security key service 410 modifies the lifetime of the key of the security group. In an example, the key parameter index is a lifetime value determined by the publisher 440 for its bandwidth. For example, the value of the key parameter index associated with publisher 440 is 30 minutes. Since a new publisher is being added to the group, the cumulative bandwidth of the security group increases and the life time of the key of the group is accordingly reduced based on the lifetime value from the publisher 440. The modification may be based one or more known mathematical functions, such as average value determination and/or minimum value determination. The security key service 410 then responds to the publisher 440 by sending a key response 444 containing the key of the security group, the identifier associated with the security group and the modified lifetime associated with the key of the security group. Since the lifetime of the key has been modified, the security key service 410 notifies the publisher 430 of the modified lifetime of the key via key lifetime modification messages 436. In an example, the security key service also sends a key lifetime modification message to the subscriber 410 indicating the modified lifetime of the key.

At a fourth time instance (also referred to as T4, subsequent to the third time instance), the security key service 410 receives an exit notification 439 from the publisher 430 indicating that the publisher 430 is leaving the security group. Accordingly, based on the key parameter index of the request 431, the security key service modifies or adjusts the lifetime of the key of the group. Since an existing publisher is leaving the security group, the cumulative bandwidth of the security group reduces and accordingly, the life time of the key of the group is extended. Since the lifetime of the key has been modified, the security key service 410 notifies the publisher 440 of the modified lifetime of the key via key lifetime modification messages 446. In an example, the security key service also sends a key lifetime modification message to the subscriber 410 indicating the modified lifetime of the key.

It may be noted that while the current invention has been explained using one security group and one security key service, the security key service can manage a plurality of security groups. Additionally, while the above methods as explained using requests originating from publishers and subscribers, these requests for keys can also originate from a configuration tool. A configuration tool while engineering a publisher can send such a request on behalf of the publisher.

The present disclosure can take the form of a computer program product comprising program modules accessible from computer-usable or computer-readable mediums storing program code for use by or in connection with one or more computers, processing units, or instruction execution system. For example, the methods 200 and 300 may be realized across one or more devices.

Accordingly, the current disclosure describes an industrial device 500 for managing at least one key of a security group. The industrial device 500 comprises a network interface 510 and one or more processors 520 configured to execute a plurality of instructions (533, 536) stored on the memory module or non-transitory storage medium 530. Upon execution of the publisher event detection instructions 533, the one or more processors 520 are configured to detect an event associated with one of a new publisher and a publisher from the one or more publishers. Then, the one or more publishers are configured to obtain a key parameter index associated with the detected one of the new publisher and the publisher, where the key parameter index is indicative of a bandwidth of the detected one of the new publisher and the publisher. Upon execution of the key lifetime modification instructions 536, the one or more processors 520 are configured to modify a lifetime value of the at least one key based on the obtained key parameter index, where the at least one key expires at a time based on the lifetime value of the at least one key.

For the purpose of this description, a computer-usable or computer-readable non-transitory storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to few industrial devices, a plurality of industrial devices may be utilized in the context of the current disclosure. While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

What is claimed is:

1. A method of adding a new publisher to a security group comprising at least one first publisher and at least one subscriber, the method comprising:
   a) receiving a key request for keys for the new publisher, the key request comprising at least one credential associated with the new publisher and a key parameter index indicative of a bandwidth of the new publisher, the at least one first publisher and the new publisher being configured to publish messages utilizing at least one key associated with the security group;
   b) modifying a lifetime value of the at least one key of the security group based on the key parameter index of the received key request, an expiry of the at least one key being based on the lifetime value of the at least one key; and
   c) transmitting the at least one key and the modified lifetime value of the at least one key to the new publisher, the new publisher being configured to publish at least one message utilizing the at least one key prior to the expiry of the at least one key.

2. The method as claimed in claim 1, wherein the key request is generated by a configuration tool.

3. The method as claimed in claim 1, wherein the key request is generated by the new publisher.

4. The method as claimed in claim 1, wherein the method is performed by a security key service.

5. A method of managing at least one key of a security group comprising at least one first publisher and at least one subscriber, the method comprising:
   a) detecting an event associated with one of a new publisher and a publisher from the at least one first publisher;
   b) determining a key parameter index associated with one of the new publisher and the at least one first publisher, the key parameter index being indicative of a bandwidth of one of the new publisher and the at least one first publisher, and the at least one first publisher being configured to publish data utilizing the at least one key of the security group; and
   c) modifying a lifetime value of the at least one key based on the determined key parameter index, the at least one key expiring at a time instance based on the lifetime value of the at least one key.

6. The method as claimed in claim 5, further comprising: distributing a new key and a lifetime value associated with the new key to the at least one first publisher and the at least one subscriber of the security group, at the expiry of the at least one key;
   wherein the lifetime value of the new key is based on a bandwidth associated with the at least one first publisher.

7. The method as claimed in claim 5, wherein the at least one first publisher includes a programmable logic controller.

8. An industrial device for managing at least one key of a security group comprising at least one first publisher and at least one subscriber, the at least one first publisher being configured to publish data utilizing the at least one key, the industrial device comprising at least one processor configured to:
   a) detect an event associated with one of a new publisher and a publisher from the at least one first publisher;
   b) determine a key parameter index associated with one of the new publisher and the at least one first publisher, the key parameter index being indicative of a bandwidth of one of the new publisher and the at least one first publisher, and the at least one first publisher being configured to publish data utilizing the at least one key; and
   c) modify a lifetime value of the at least one key based on the determined key parameter index, the at least one key expiring at a time instance based on the lifetime value of the at least one key.

9. A non-transitory storage medium for managing at least one key of a security group comprising at least one first publisher and at least one subscriber, the non-transitory storage medium comprising a plurality of instructions which, when executed by at least one processor, cause the at least one processor to:
   a) detect an event associated with a new publisher and a publisher from the at least one first publisher;
   b) determine a key parameter index associated with one of the new publisher and the at least one first publisher, the key parameter index being indicative of a bandwidth of one of the new publisher and the at least one first publisher, and the at least one first publisher being configured to publish data utilizing the at least one key; and
   c) modify a lifetime value of the at least one key based on the determined key parameter index, the at least one key expiring at a time instance based on the lifetime value of the at least one key.

* * * * *